(12) United States Patent
Yamaguchi

(10) Patent No.: US 6,609,439 B1
(45) Date of Patent: Aug. 26, 2003

(54) DRUM SUPPORTING STRUCTURE FOR AUTOMOTIVE AUTOMATIC TRANSMISSION

(75) Inventor: Toshio Yamaguchi, Kanagawa (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 09/691,849

(22) Filed: Oct. 18, 2000

(30) Foreign Application Priority Data

Oct. 19, 1999 (JP) .......................... 11-296458

(51) Int. Cl.⁷ .............................. F16H 57/02
(52) U.S. Cl. .................................... 74/606 R
(58) Field of Search ................. 74/606 R; 384/275

(56) References Cited

U.S. PATENT DOCUMENTS

| | | | | |
|---|---|---|---|---|
| 4,759,234 A | * | 7/1988 | Premski et al. ............... | 74/764 |
| 4,917,509 A | * | 4/1990 | Takano ........................ | 384/275 |
| 5,188,575 A | * | 2/1993 | Leising et al. .............. | 475/280 |
| 5,676,230 A | * | 10/1997 | Awaji et al. ............ | 192/110 B |
| 5,716,143 A | * | 2/1998 | Browne et al. ............. | 384/192 |
| 5,960,675 A | * | 10/1999 | Murota ........................ | 74/606 |

\* cited by examiner

*Primary Examiner*—Rodney H. Bonck
*Assistant Examiner*—Eric M Williams
(74) *Attorney, Agent, or Firm*—Foley & Lardner

(57) ABSTRACT

The drum supporting structure comprises larger and smaller diameter portions and a radially raised wall portion which are defined by the aluminum drum support, the radially raised wall portion being arranged at an axially base end of the larger diameter portion and the larger diameter portion having seal rings concentrically mounted thereon; a first steel sleeve coaxially fitted to a cylindrical inner wall of the larger diameter bore, the first steel sleeve including a cylindrical major portion which is slidably put on the seal rings and a cylindrical end portion which is slidably and directly supported on the larger diameter portion of the drum support and a second steel sleeve coaxially fitted to a cylindrical outer wall of the smaller diameter portion of the drum support to bear a cylindrical inner wall of the smaller diameter bore of the drum.

11 Claims, 9 Drawing Sheets

|  | C1 | C2 | C3 | B1 | B2 | B3 | B4 | F1 | F2 | F3 |
|---|---|---|---|---|---|---|---|---|---|---|
| 1st |  | (○)* |  |  | ● | (○) | ○ |  | △ | △ |
| 2nd |  |  | ○ |  | (○) | (○) | ○ |  | △ | △ |
| 3rd |  | ○ | ○ |  | (○) |  | ● | C | △ |  |
| 4th | ○ | ○ | ○ |  |  |  | ● | C |  |  |
| 5th | ○ | ○ |  |  | ○ |  | ● | C | C |  |
| Rev |  | ○ |  | ○ | ○ |  |  | △ | △ |  |

1st - GEAR

2nd - GEAR

3rd - GEAR

4th - GEAR

5th - GEAR

REVERSE GEAR

DRUM SUPPORTING STRUCTURE FOR AUTOMOTIVE AUTOMATIC TRANSMISSION

BACKGROUND OF THE INVENTION

1. Field of the Invention

The present invention relates in general to automotive automatic transmissions, and more particularly to a drum supporting structure installed in the automatic transmission for rotatably supporting an aluminum drum on an aluminum drum support. More specifically, the present invention is concerned with a bearing arrangement installed in the drum supporting structure, by which an undesired centrifugal whirling of the drum about the drum support is suppressed during rotation of the drum.

2. Description of the Prior

In automotive automatic transmissions of a type wherein an aluminum drum is rotatably supported by an aluminum drum support, various drum supporting structures have been hitherto proposed and put into practical use. One of them is such a structure as shown in FIG. 13.

That is, in such a conventional drum supporting structure, a first steel sleeve 104 is press-fitted in a larger diameter bore of the aluminum drum 103, a second steel sleeve 105 is press-fitted on a smaller diameter portion of the aluminum drum support 102 and a steel ring 111 is fitted to a raised wall of the drum support 102. Upon assembly, the first steel sleeve 104 is carried on three seal rings 102a, 102b and 102c mounted on a larger diameter portion of the drum support 102, the second steel sleeve 105 carries thereon a cylindrical inner wall of a smaller diameter bore of the drum 103, and the steel ring 111 bears an axial base end of the drum 103, as shown.

That is, in the illustrated conventional drum supporting structure, three steel members, which are the first and second steel sleeves 104 and 105 and the steel ring 111, are interposed between the aluminum drum support 102 and the aluminum drum 103. However, practical supporting of the aluminum drum 103 on the aluminum drum support 102 is carried out by only the second steel sleeve 105. That is, due to presence of the three seal rings 102a, 102b and 102c between the first steel sleeve 104 and the aluminum drum support 102, the first steel sleeve 104 does not participate in supporting the drum 103 on the drum support 102. That is, a so-called one point supporting is employed in the illustrated conventional drum supporting structure.

However, the one point supporting tends to bring about undesired centrifugal whirling of the drum 103 relative to the drum support 102 when the drum 103 rotates about the drum support 102. This phenomenon becomes much severe when the axial length of the drum 103 increases.

Furthermore, usage of the three steel members 104, 105 and 111 has brought about a time-consumed and troublesome assembling work. Particularly, fixing the steel ring 111 to the raised wall of the drum support 102 has needed a very skilled technique. These have caused a costly assemblage of the transmission. Furthermore, in such drum supporting structure, it has been difficult to feed a sufficient amount of lubrication oil to an end clearance 110 which inevitably appears between the drum support 102 and the drum 103 at a position between the first steel member 104 and the steel ring 111. In fact, even when an oil passage "O" is provided in the larger diameter portion of the drum support 102 to lubricate such end clearance 110 by using a lubrication oil flowing in a lubrication oil passage formed in an output shaft OUT, adequate oil feeding to the clearance 110 is not expected.

SUMMARY OF THE INVENTION

It is therefore an object of the present invention to provide a drum supporting structure for an automotive automatic transmission, which is free of the above-mentioned drawbacks.

According to the present invention, there is provided a drum supporting structure for use in an automatic transmission. The automatic transmission includes a transmission case, an aluminum drum support fixed to the transmission case, an aluminum drum rotatably held by the drum support, a piston installed in the drum, a hydraulic fluid passage formed in the drum to feed the piston with a hydraulic work, a lubrication oil passage formed in the drum support to feed the piston with a lubrication oil, and seal rings for hermetically separating the lubrication fluid passage and the lubrication oil passage. The drum supporting structure comprises larger and smaller diameter portions and a radially raised wall portion which are defined by the aluminum drum support, the radially raised wall portion being arranged at an axially base end of the larger diameter portion, the larger diameter portion having the seal rings concentrically mounted thereon; larger and smaller diameter bores defined by the aluminum drum to respectively receive therein the larger and smaller diameter portions of the drum support allowing an axially base end of the drum to face the radially raised wall portion of the drum support; a first steel sleeve coaxially fitted to a cylindrical inner wall of the larger diameter bore, the first steel sleeve including a cylindrical major portion which is slidably put on the seal rings and a cylindrical end portion which is slidably and directly supported on the larger diameter portion of the aluminum drum support, the cylindrical major portion and the cylindrical end portion being integrally connected to constitute a single unit; and a second steel sleeve coaxially fitted to a cylindrical outer wall of the smaller diameter portion of the drum support to bear a cylindrical inner wall of the smaller diameter bore of said drum.

BRIEF DESCRIPTION OF THE DRAWINGS

Other objects and advantages of the present invention will become apparent from the following description when taken in conjunction with the accompanying, in which.

DETAILED DESCRIPTION OF THE INVENTION

Figure 1:
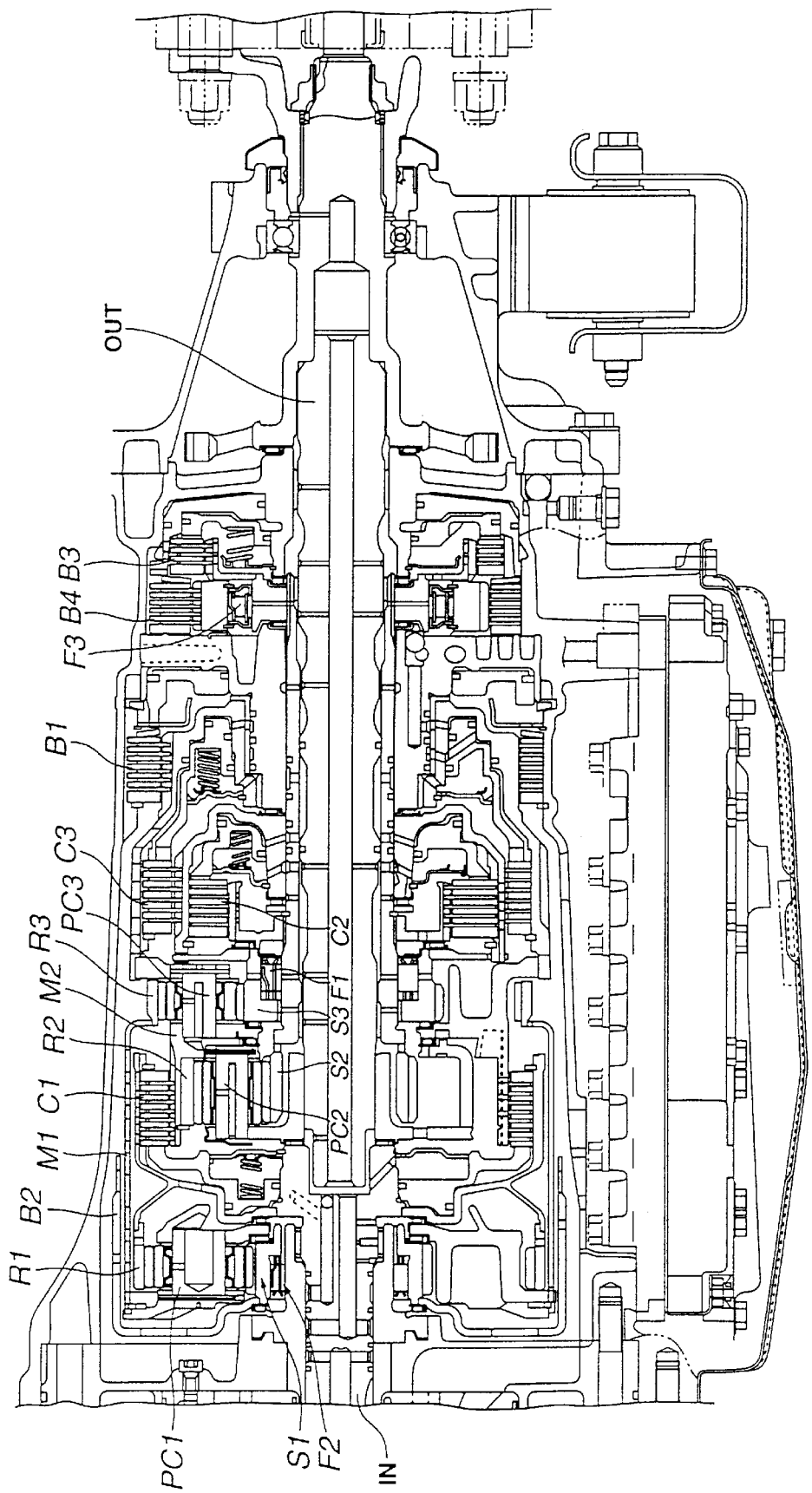
FIG. 1 is a sectional view of an automotive automatic transmission to which the present invention is practically applied.
Figures 2, 3:
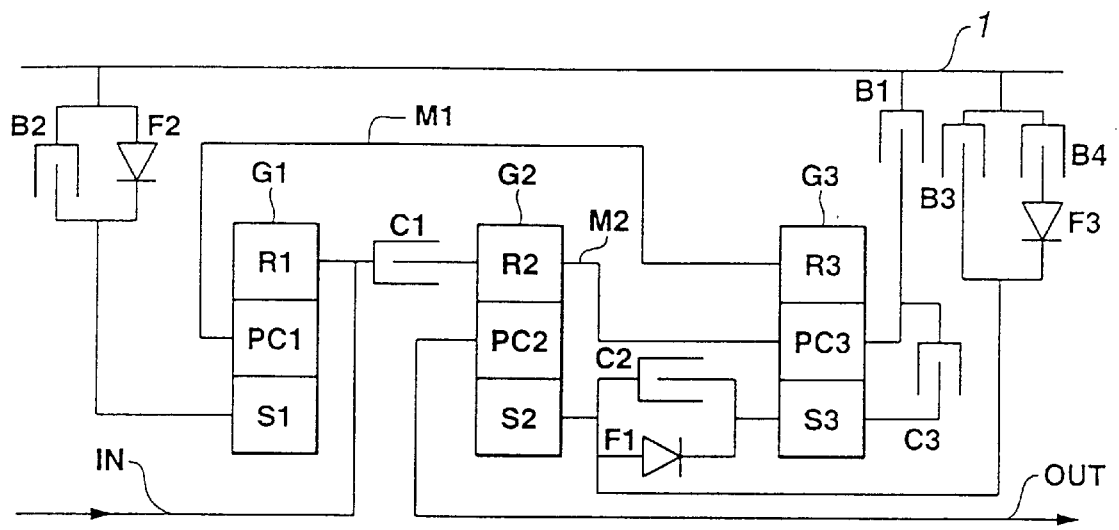
FIG. 2 is a power train possessed by the automatic transmission to which the present invention is practically applied.
FIG. 3 is a table showing various conditions taken by various friction elements used in the automatic transmission to which the invention is practically applied.
Figure 4:
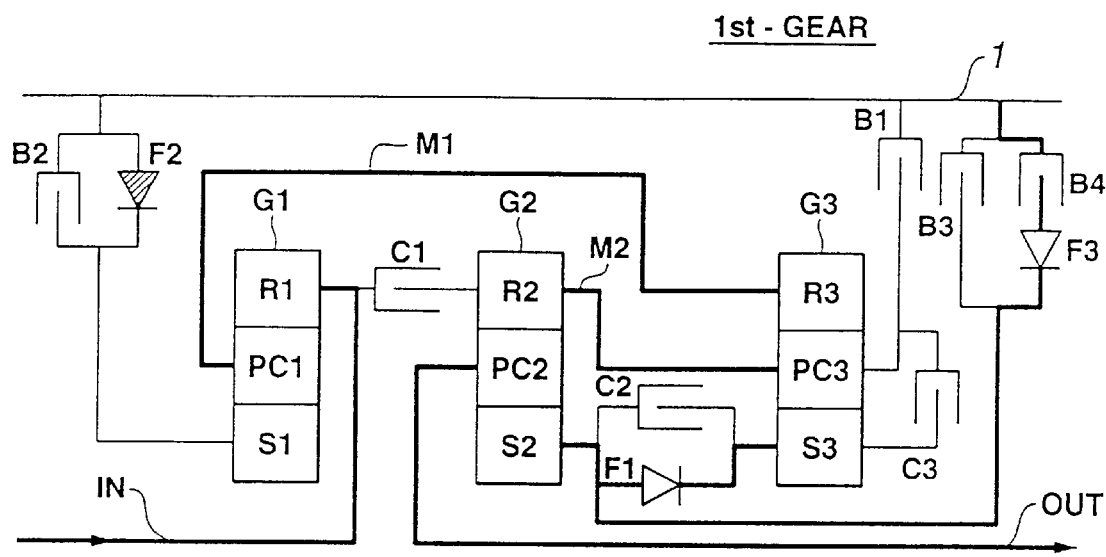
FIG. 4 is a view similar to FIG. 2, but showing a torque transmission path that is established when the automatic transmission assumes First gear.
Figure 5:
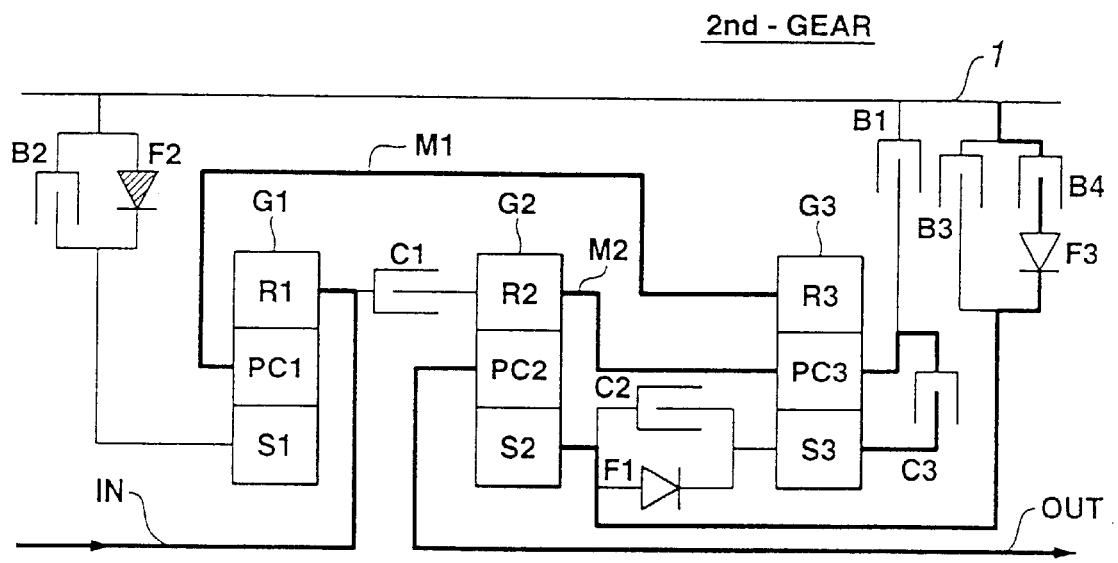
FIG. 5 is a view similar to FIG. 2, but showing a torque transmission path that is established when the automatic transmission assumes Second gear.
Figure 6:
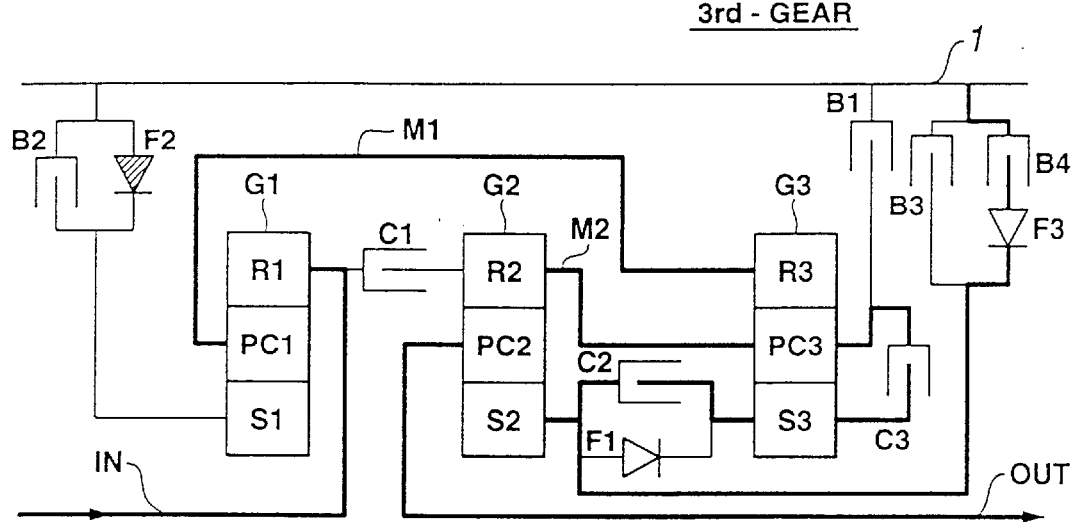
FIG. 6 is a view similar to FIG. 2, but showing a torque transmission path that is established when the automatic transmission assumes Third gear.
Figure 7:
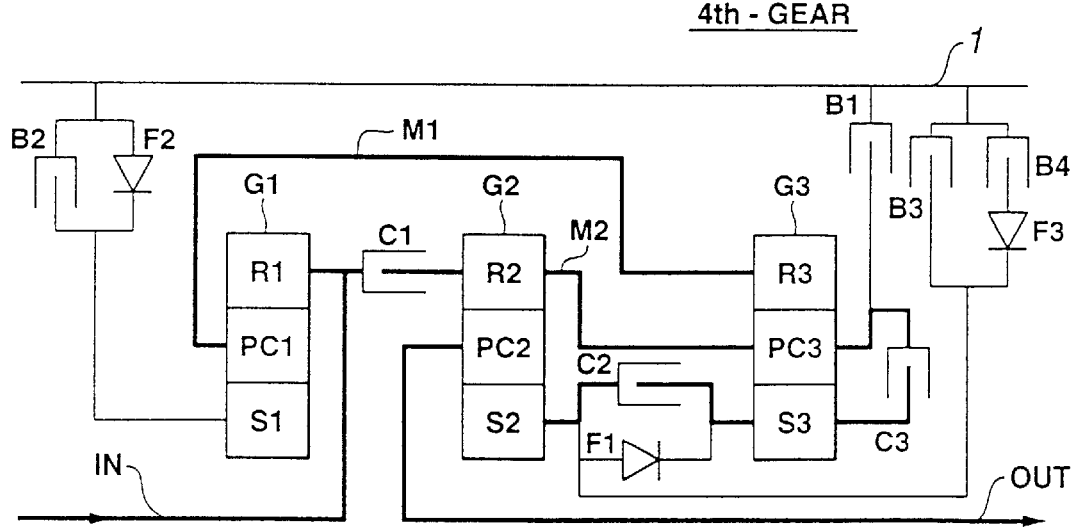
FIG. 7 is a view similar to FIG. 2, but showing a torque transmission path that is established when the automatic transmission assumes Fourth gear.
Figure 8:
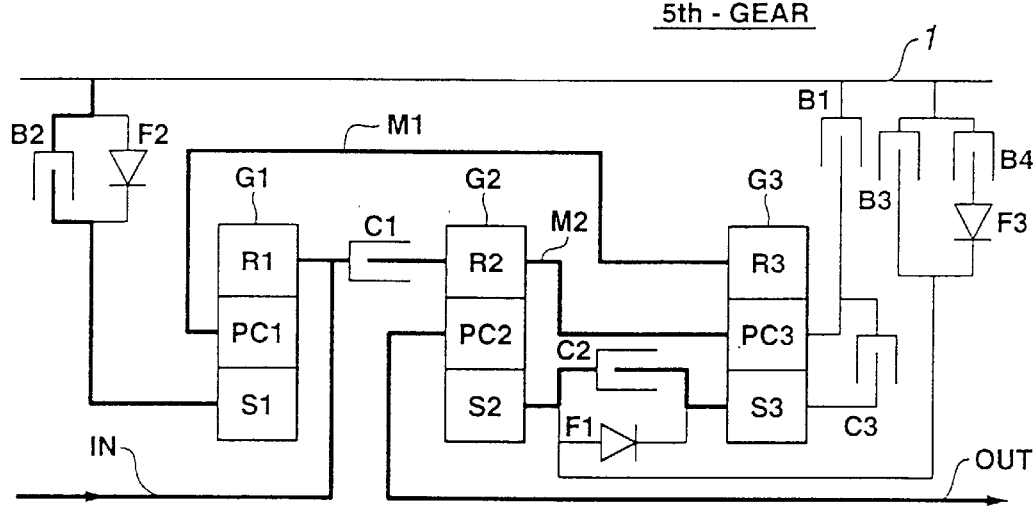
FIG. 8 is a view similar to FIG. 2, but showing a torque transmission path that is established when the automatic transmission assumes Fifth gear.

Referring to FIGS. 1 and 2, there is shown an automotive automatic transmission to which the present invention is practically applied.

In the drawings, particularly in FIG. 2, designated by G1, G2 and G3 are first, second and third planetary gear units, designated by M1 and M2 are first and second connecting members, designated by C1, C2 and C3 are first, second and third clutches, designated by B1, B2, B3 and B4 are first, second, third and fourth brakes, designated by F1, F2 and F3 are first, second and third one-way clutches and designated by "IN" and "OUT" are input and output shafts respectively.

The first planetary gear unit G1 is of a single pinion type that comprises a first sun gear S1, a first ring gear R1, a first pinion (not shown) engaged with both the first sun gear S1 and the first ring gear R1 and a first carrier PC1 carrying the first pinion.

The second planetary gear unit G2 is also of a single pinion type that comprises a second sun gear S2, a second ring gear R2, a second pinion (not shown) engaged with both the second sun gear S2 and the second ring gear R2 and a second carrier PC2 carrying the second pinion.

The third planetary gear unit G3 is also of a single pinion type that comprises a third sun gear 53, a third ring gear R3, a third pinion engaged with both the third sun gear S3 and the third ring gear R3 and a third carrier PC3 carrying the third pinion.

The first connecting member M1 integrally connects the first carrier PC1 and the third ring gear R3.

The second connecting member M2 integrally connects the second ring gear R2 and the third carrier PC3.

The first clutch C1 selectively establishes connection or disconnection between the first ring gear R1 and the second ring gear R2.

The second clutch C2 selectively establishes connection or disconnection between the second sun gear S2 and the third sun gear S3. To this second clutch C2, there is connected the first one-way clutch F1 in parallel.

The.third clutch C3 selectively establishes connection or disconnection between the third carrier PC3 and the third sun gear S3.

The first brake B1 selectively brakes rotation of the second connecting member M2.

The second brake B2 selectively brakes rotation of the first sun gear S1. To this second brake B2, there is connected the second one-way clutch F2 in parallel.

The third brake B3 selectively brakes rotation of the second sun gear S2. To this third brake B3, there is connected in parallel a unit that includes the fourth brake B4 and the third one-way clutch F3 which are arranged in series as shown.

The input shaft IN is connected to the first ring gear R1, so that an engine torque is applied to the first ring gear R1 through a torque converter (not shown).

The output shaft OUT is connected to the second carrier PC2, so that an output torque from the second carrier PC2 is transmitted to drive wheels (not shown) through a final gear unit (not shown).

To the clutches C1, C2 and C3 and the brakes B1, B2, B3 and B4, there are connected a hydraulic pressure control device by which engaging pressure and releasing pressure for such friction elements are produced. The hydraulic pressure control device may be of a mechanically controlling type, an electronically controlling type or a combination of these two types.

FIG. 3 is a table showing various conditions taken by the various friction elements when the automatic transmission assumes First, Second, Third, Fourth, Fifth and Reverse gears.

In the table of FIG. 3, mark "Δ" represents that the corresponding friction element participates in torque transmission when assuming ON condition (viz., power ON), mark "C" represents that the corresponding friction element participates in torque transmission when the corresponding vehicle is under coasting, mark "574" represents that the corresponding friction element has no effect on the output of the transmission even when applied with a hydraulic pressure, mark "(O)" represents that the corresponding friction element takes an engaged condition under overrun mode, mark "(O)*" represents that the corresponding friction element assumes an engaged condition at the time when the corresponding gear (viz. first gear) is selected and thereafter the friction element takes a disengaged condition in a mode other than the overrun mode, and mark "O" represents that the corresponding friction element takes an engaged condition.

FIGS. 4 to 9 are schematic illustrations of power train showing respective torque transmission paths that are established when the automatic transmission assumes First, Second, Third, Fourth, Fifth and Reverse gears.

Figure 10:
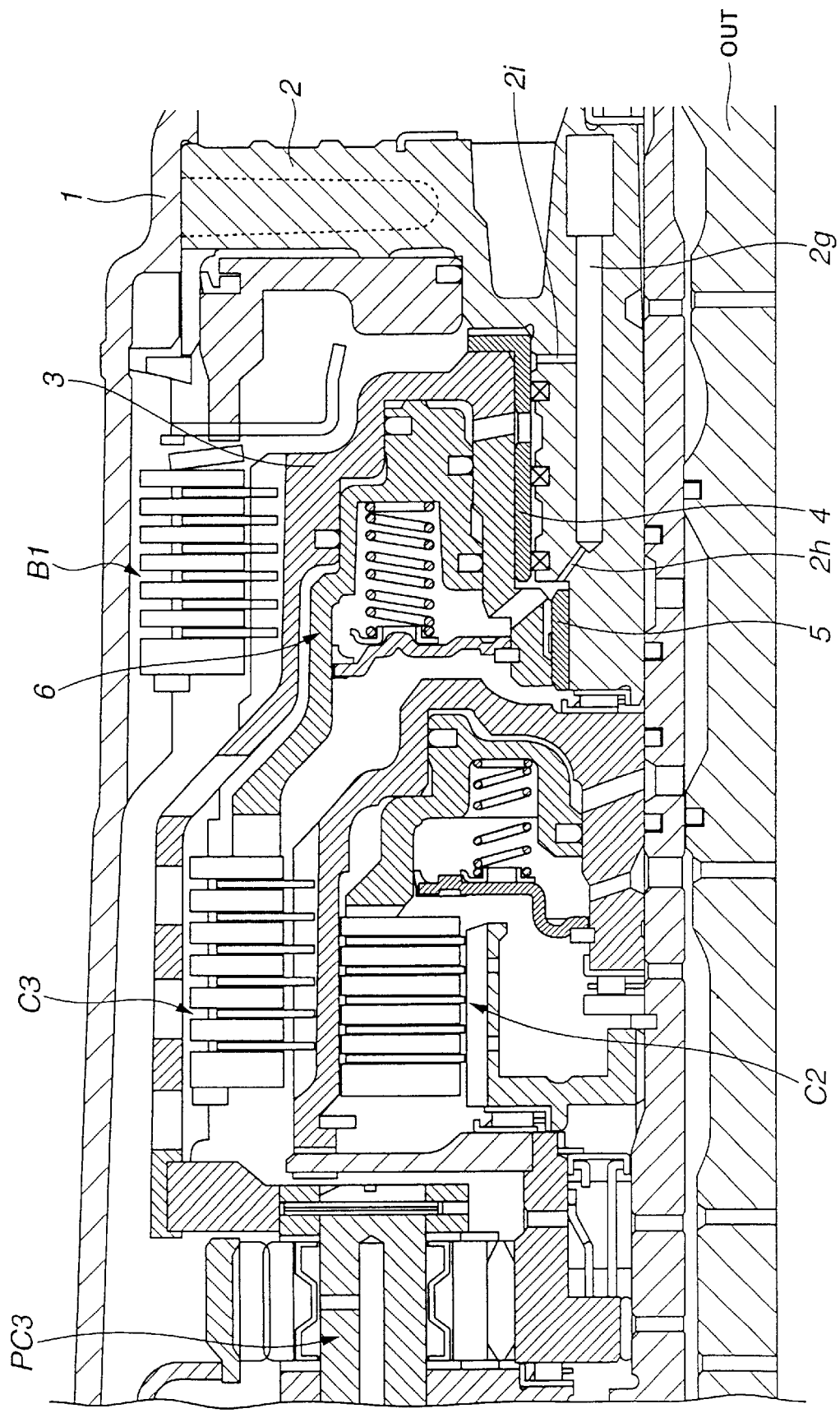
FIG. 10 is an enlarged sectional view of an upper half of a part of the automatic transmission where a drum supporting structure of the present invention is installed.
Figure 11:
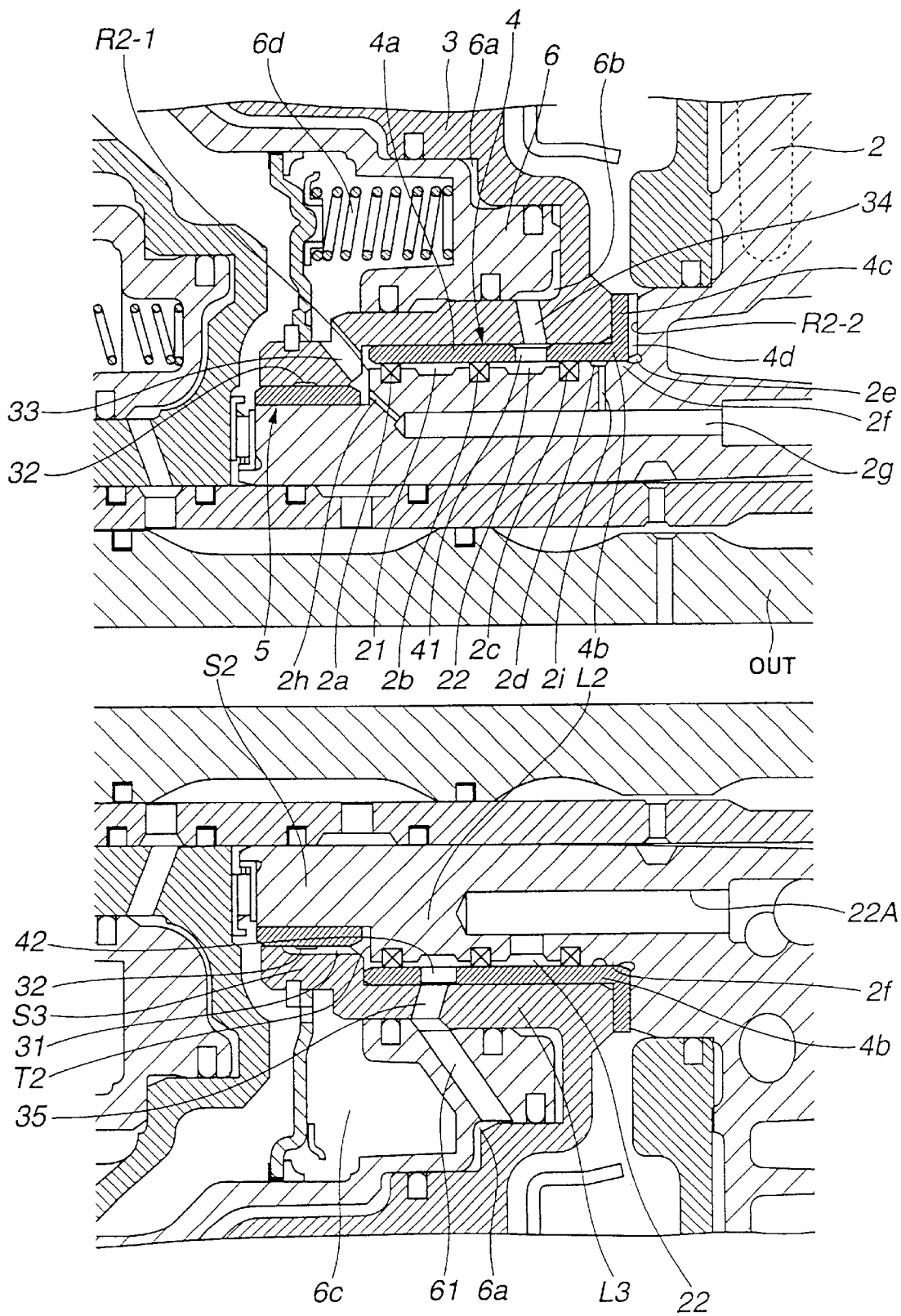
FIG. 11 is an enlarged sectional view of the entirety-of the part of the automatic transmission where the drum supporting structure of the present invention is installed.

Referring to FIGS. 10 and 11, there is shown a part of the automatic transmission where a drum supporting structure of the present invention is practically arranged.

In FIG. 10, denoted by numeral 1 is a transmission case. An aluminum drum support 2 is immovably installed in the transmission case 1. Rotatably supported by the aluminum drum support 2 is an aluminum drum 3. Operatively installed in the drum 3 is a piston 6. The drum 3 is engageable with the above-mentioned first reverse brake B1 and third clutch C3 in a known manner, and the drum 3 is connected to the above-mentioned third pinion carrier PC3 to rotate together, in a known manner.

As will be described in detail hereinafter, the aluminum drum 3 has a first steel sleeve 4 press-fitted thereto to be frictionally sustained by the drum support 2, and the aluminum drum support 2 has a second steel sleeve 5 press-fitted thereto to frictionally sustain the drum 3. The entire arrangement of the first and second steel sleeves 4 and 5 and the positional relation therebetween are well understood from FIG. 11 which shows in detail the exact portion where the aluminum drum 3 is rotatably supported by the aluminum drum support 2.

As is shown in FIG. 11, the drum support 2 comprises coaxial larger and smaller diameter portions "L2" and "S2" which have a first radially raised wall "R2-1" provided therebetween. The drum support 2 further comprises a second radially raised wall "R2-2" that is integrally formed on an axially base end of the larger diameter portion "L2".

The larger and smaller diameter portions "L2" and "S2" of the drum support 2 respectively support larger and smaller diameter portions "L3" and "S3" of the drum 3. More specifically, the larger and smaller diameter portions "L2" and "S2" of the drum support 2 respectively support inner walls of larger and smaller cylindrical bores of the larger and smaller diameter portions "L3" and "S3" of the drum 3, as shown.

The larger diameter portion "L2" of the drum support 2 is formed at its cylindrical outer wall with two annular grooves 21 and 22 for flowing hydraulic work fluid. Each groove 21 or 22 is hermetically sealed by seal rings 2a and 2b (or, 2b and 2c) operatively disposed on the cylindrical outer wall of the larger diameter portion "L2".

As shown in FIG. 11, the annular groove 22 is connected with a working fluid passage 22A that extends axially in the drum support 2. Although not shown in the drawing, another working fluid passage is formed in the drum support 2, which is connected with the other annular groove 21.

The drum support 2 is further formed with an axially extending oil passage 2g that has first and second branch passages 2h and 2i. The first branch passage 2h leads to the bottom of the first radially raised wall "R2-1" and the second branch passage 2i leads to the outer wall of the larger diameter portion "L2", as shown. Through these oil passages 2g, 2h and 2i, lubrication oil is led to various portions between the drum support 2 and the drum 3 where lubrication is needed. Although not shown in the drawings, the transmission case 1 is formed with passages through which the lubrication oil is conveyed to the oil passage 2g.

It is to be noted that the cylindrical outer wall of the larger diameter portion "L2" has near the axially base end thereof an annular bearing ridge 2f. The annular bearing ridge 2f lies between two smaller lubrication oil grooves 2d and 2e formed at the outer wall of the larger diameter portion "L2". As shown, the groove 2e is provided at the axially base end of the larger diameter portion "L2".

The smaller diameter portion "S3" of the drum 3 is formed at the cylindrical inner wall thereof with an oil passage 31 and an annular oil groove 32. The oil passage 31 serves to convey the lubrication oil from the first branch passage 2h to the annular oil groove 32.

The drum 3 is further formed with passages 33, 34 and 35 which serve to feed the piston 6 with the hydraulic work fluid.

The first steel sleeve 4 is press-fitted on the cylindrical inner wall of the larger diameter portion "L3" of the drum 3 and rotatably sustained on the larger diameter portion "L2" of the drum support 2.

As shown, the first steel sleeve 4 is of a single member which comprises a cylindrical major portion 4a, a cylindrical end portion 4b and an annular flange portion 4c which are coaxially arranged. As shown, the cylindrical major portion 4a and the cylindrical end portion 4b are integrated and arranged to entirely cover the cylindrical inner wall of the larger diameter portion "L3" of the drum 3, and the annular flange portion 4c is integrally connected to the cylindrical end portion 4b and arranged to cover a radially raised wall of the axially base end of the larger diameter portion "L3", as shown.

It is to be noted that the cylindrical major portion 4a of the first steel sleeve 4 is slidably put on the three seal rings 2a, 2b and 2c and the cylindrical end portion 4b of the sleeve 4 is directly supported on the annular bearing ridge 2f of the drum support 2. In other words, in the first steel sleeve 4, the cylindrical major portion 4a does not participate in supporting the drum 3 on the drum support 2. That is, only the cylindrical end portion 4b of the sleeve 4 does such supporting function. For lubrication of the cylindrical end portion 4b and the annular bearing ridge 2f, lubrication oil is fed to such portions through the second branch passage 2i of the axially extending oil passage 2g of the drum support 2.

The annular flange portion 4c bears the second radially raised wall "R2-2" of the drum support 2. The annular flange portion 4c is formed with radially extending oil grooves 4d. These oil grooves 4d are communicated with the second branch passage 2i.

The first steel sleeve 4 is further formed with openings 41 and 42 for feeding the hydraulic work fluid to hydraulic work chambers 6a and 6b of the piston 6.

The second steel sleeve 5 is of a single member that covers a cylindrical outer wall of the smaller diameter portion "52" of the drum support 2. The second steel sleeve 5 bears the cylindrical inner wall of the smaller diameter portion "S3" of the drum 3, as shown.

The piston 6 is biased rightward in FIG. 11 by a spring 6d installed in a centrifugal force canceling chamber 6c. The hydraulic work chambers 6a and 6b are provided at a position opposite to the force canceling chamber 6c. A passage 61 is formed in the piston 6 to feed the hydraulic work chamber 6a with the hydraulic work fluid.

In the following, advantageous features of the present invention will be described with reference to the drawings.

Figure 9:
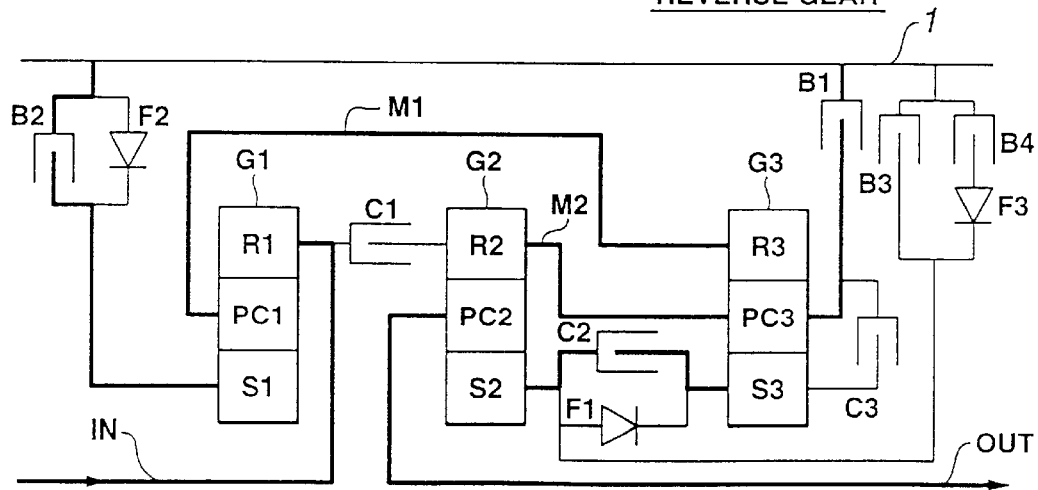
FIG. 9 is a view similar to FIG. 2, but showing a torque transmission path that is established when the automatic transmission assumes Reverse gear.

As is understood from FIGS. 9 and 10, in Reverse gear, the drum 3 connected to the third pinion carrier PC3 is fixed to the transmission case 1 by means of the first brake B1. While, as is seen from FIGS. 4 to 8, in First, Second, Third, Fourth or Fifth gear, the drum 3 is released from the transmission case 1 and driven by the third pinion carrier PC3. That is, when the transmission takes a gear position other than Reverse gear, the drum 3 is always rotated relative to the drum support 2. To this rotation, the drum supporting structure of the invention exhibits the following advantageous functions.

First, to rotatably support the aluminum drum 3 on the aluminum drum support 2, the first and second steel sleeves 4 and 5 are employed, which are spaced from each other in an axial direction. That is, as has been mentioned hereinabove, in addition to the second steel sleeve 5, the cylindrical end portion 4b of the first steel sleeve 4 is directly supported on the drum support 2. A so-called two point supporting of the drum 3 on the drum support 2 is achieved. Thus, undesired centrifugal whirling of the drum 3 under rotation of the same is suppressed. Furthermore, due to the same reason, a force inevitably applied to the seal rings 2a, 2b and 2c from the drum 3 is reduced, which protects contacting surfaces of the seal rings 2a, 2b and 2c.

Second, the first steel sleeve 4 serves to bear a radial force as well as an axial force which are inevitably applied to the drum 3 when the drum 3 is rotated. More specifically, the cylindrical end portion 4b of the first sleeve 4 serves to bear the radial force and the annular flange portion 4c serves to bear the axial force. The second steel sleeve 5 serves to bear the radial force.

Third, the lubrication oil from the first branch passage 2h (see FIG. 11) of the drum support 2 is fed to the centrifugal force canceling chamber 6c as well as to the second steel sleeve 5. For the oil feeding to this sleeve 5, the oil passage 31 and the annular oil groove 32 are effectively used. Furthermore, the lubrication oil from the second branch passage 2i is fed to the two smaller oil grooves 2d and 2e of the drum support 2 and to the oil grooves 4d of the annular flange portion 4c. With this, lubrication at the supporting annular ridge 2f, the cylindrical end portion 4b and the annular flange portion 4c is made well.

Fourth, the first steel sleeve 4 is fixed to the drum 3 to rotate therewith. Thus, upon rotation of the drum 3, the lubrication oil in the radially extending oil grooves 4d of the annular flange portion 4c is forced to flow radially outward due to the centrifugal force. This promotes the lubrication at the annular flange portion 4c.

Figure 12:
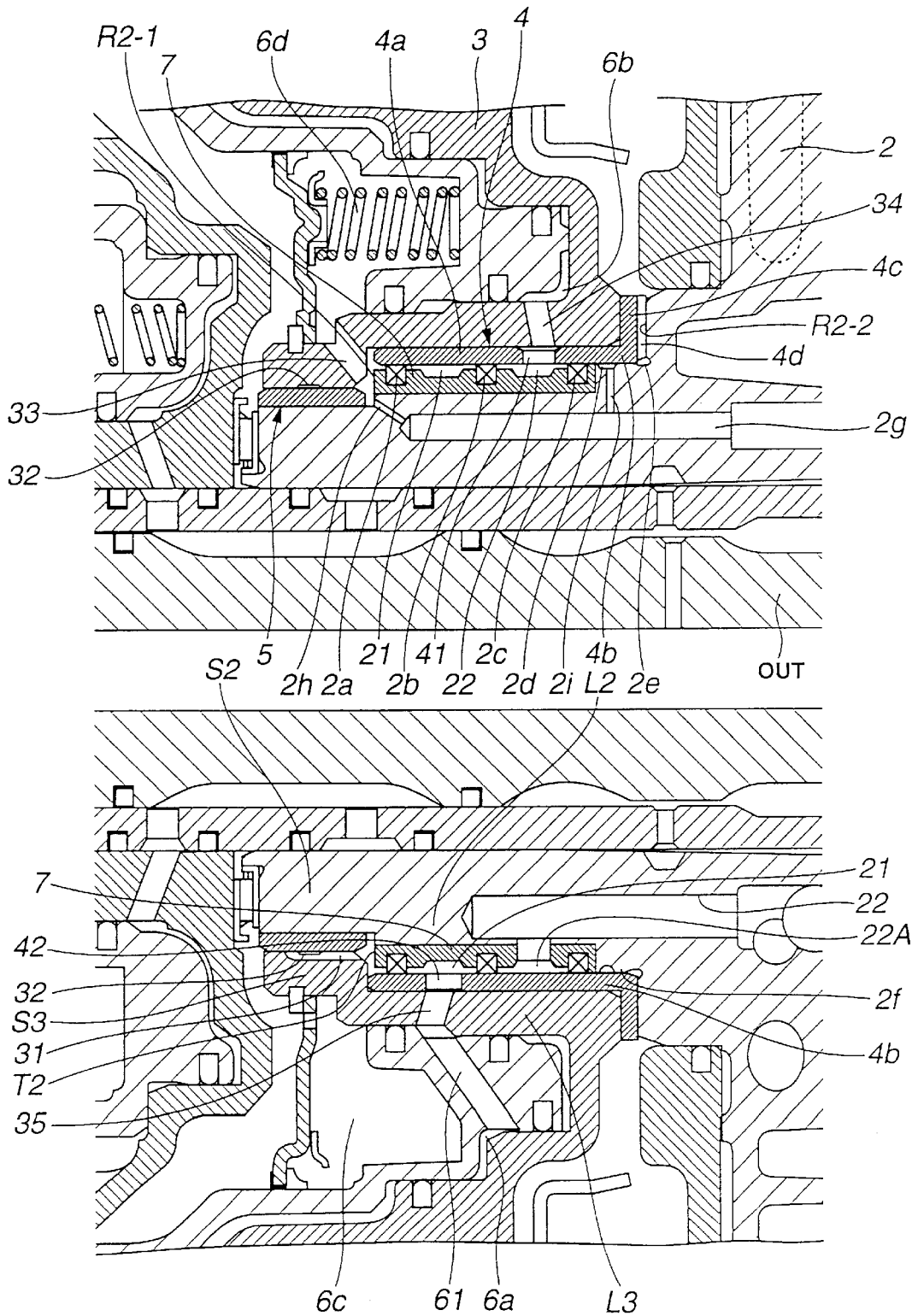
FIG. 12 is a view similar to FIG. 11, but showing a modification of the drum supporting structure of the present invention.
Figure 13:
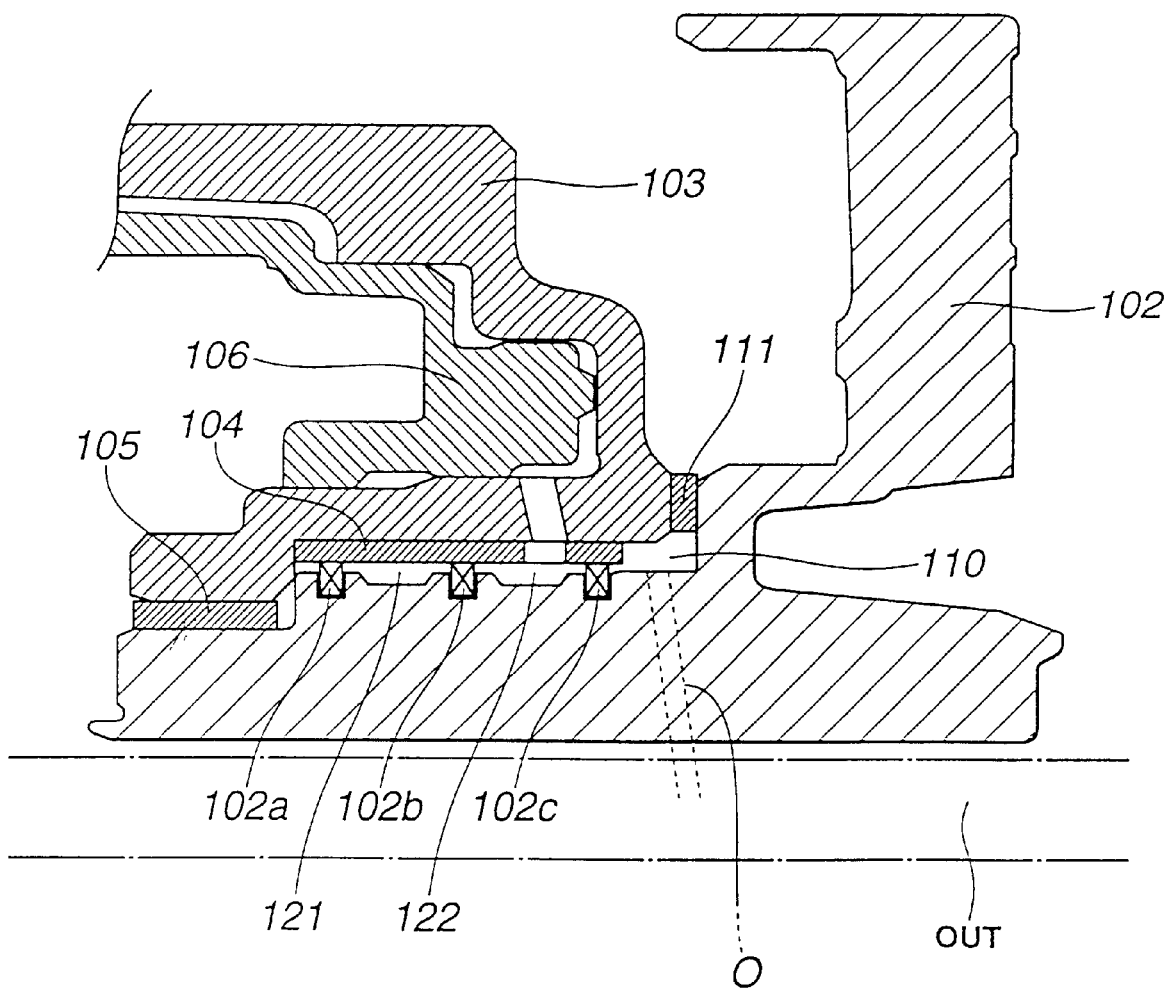
FIG. 13 is an enlarged sectional view of an upper half of a conventional drum supporting structure.

Referring to FIG. 12, there is shown a modification of the drum supporting structure of the present invention.

Since this modification is similar in construction to the above-mentioned drum supporting structure, only different portions will be described in the following.

In this modification, a third steel sleeve 7 is further employed in addition to the first and second steel sleeves 4 and 5. As shown, the third steel sleeve 7 is press-fitted on the larger diameter portion "L2" of the drum support 2 and has structures that correspond to the annular grooves 21 and 22 and the seal rings 2a, 2b and 2c.

Due to usage of the third steel sleeve 7, the durability at the portion where the seal rings 2a, 2b and 2c are provided is much assured.

The entire contents of Japanese Patent Application 11-296458 (filed Oct. 19, 1999) are incorporated herein by reference.

Although the invention has been described above with reference to the embodiments of the invention, the invention is not limited to such embodiments as described above. Various modifications and variations of such embodiments may be carried out by those skilled in the art, in light of the above descriptions.

What is claimed is:

1. In an automatic transmission including a transmission case, an aluminum drum support fixed to said transmission case, an aluminum drum rotatably held by said drum support, a piston installed in said drum, a lubrication fluid passage formed in said drum to feed said piston with a hydraulic work fluid, a lubrication oil passage formed in said drum support to feed given portions with a lubrication oil, and seal rings for hermetically separating said lubrication fluid passage and said lubrication oil passage, a drum supporting structure comprising:
larger and smaller diameter portions and a radially raised wall portion which are defined by said aluminum drum support, said radially raised wall portion being arranged at an axially base end of said larger diameter portion, said larger diameter portion having said seal rings concentrically mounted thereon;
larger and smaller diameter bores defined by said aluminum drum to respectively receive therein said larger and smaller diameter portions of said drum support allowing an axially base end of said drum to face said radially raised wall portion of said drum support;
a first steel sleeve coaxially fitted to a cylindrical inner wall of said larger diameter bore, said first steel sleeve including a cylindrical major portion which is slidably put on said seal rings and a cylindrical end portion which is slidably and directly supported on said larger diameter portion of said aluminum drum support, said cylindrical major portion and said cylindrical end portion being integrally connected to constitute a single unit; and
a second steel sleeve coaxially fitted to a cylindrical outer wall of said smaller diameter portion of said drum support to bear a cylindrical inner wall of said smaller diameter bore of said drum.

2. A drum supporting structure as claimed in claim 1, further comprising a lubrication oil passage which is provided in said drum support to feed the mutually contacting surfaces of said cylindrical end portion of said first steel sleeve and said larger diameter portion of said drum support with a lubrication oil.

3. A drum supporting structure as claimed in claim 2, in which said cylindrical end portion of said first steel sleeve is positioned in the vicinity of said radially raised wall portion of said drum support.

4. A drum supporting structure as claimed in claim 3, in which said first steel sleeve further includes an annular flange portion which is arranged on said axially base end of said drum to bear said radially raised wall of said drum support.

5. A drum supporting structure as claimed in claim 4, in which said annular flange portion of said first steel sleeve is formed with radially extending oil grooves for feeding the lubrication oil between said annular flange portion and said radially raised wall portion.

6. A drum supporting structure as claimed in claim 1, in which said first steel sleeve is press-fitted to the cylindrical inner wall of said larger diameter bore of said drum and in which said second steel sleeve is press-fitted to the cylindrical outer wall of said smaller diameter portion of said drum support.

7. A drum supporting structure as claimed in claim 1, in which said cylindrical major portion of said first steel sleeve is formed with hydraulic fluid openings to feed the piston with the hydraulic work fluid through said lubrication fluid passage formed in said drum.

8. A drum supporting structure as claimed in claim 1, in which said seal rings are coaxially mounted on the cylindrical outer wall of said larger diameter portion of said drum support, said seal rings supporting thereon a cylindrical inner wall of said cylindrical major portion of said first steel sleeve.

9. A drum supporting structure as claimed in claim 8, in which the cylindrical outer wall of the larger diameter portion of said drum support is formed with annular grooves for feeding the piston with the hydraulic work fluid through the hydraulic fluid passage formed in said first steel sleeve and the hydraulic fluid passage formed in said drum, each annular groove being positioned between adjacent two of said seal rings.

10. A drum supporting structure as claimed in claim 1, in which the cylindrical inner wall of said smaller diameter bore of said drum is formed with an annular oil groove and an oil passage merged with said annular oil groove.

11. A drum supporting structure as claimed in claim 1, further comprising a third steel sleeve which is coaxially mounted on the cylindrical outer wall of the larger diameter portion of said drum support, said third steel sleeve having a plurality of annular grooves in which said seal rings are disposed.

* * * * *